Nov. 8, 1927.

J. C. WILLIAMSON

GEARING

Filed April 27, 1925

1,648,751

J. C. Williamson
By C. A. Snow & Co.
Attorneys.

Patented Nov. 8, 1927.

1,648,751

UNITED STATES PATENT OFFICE.

JAMES C. WILLIAMSON, OF CORDELE, GEORGIA.

GEARING.

Application filed April 27, 1925. Serial No. 26,192.

This invention relates to tractor construction and aims to provide novel means whereby power may be taken from the tractor at various speeds, thereby adapting the tractor for use as a power device for accomplishing various purposes.

An important object of the invention is the provision of gearing which will have direct connection with the transmission, and which will be capable of being thrown into and out of operation at the will of the operator.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
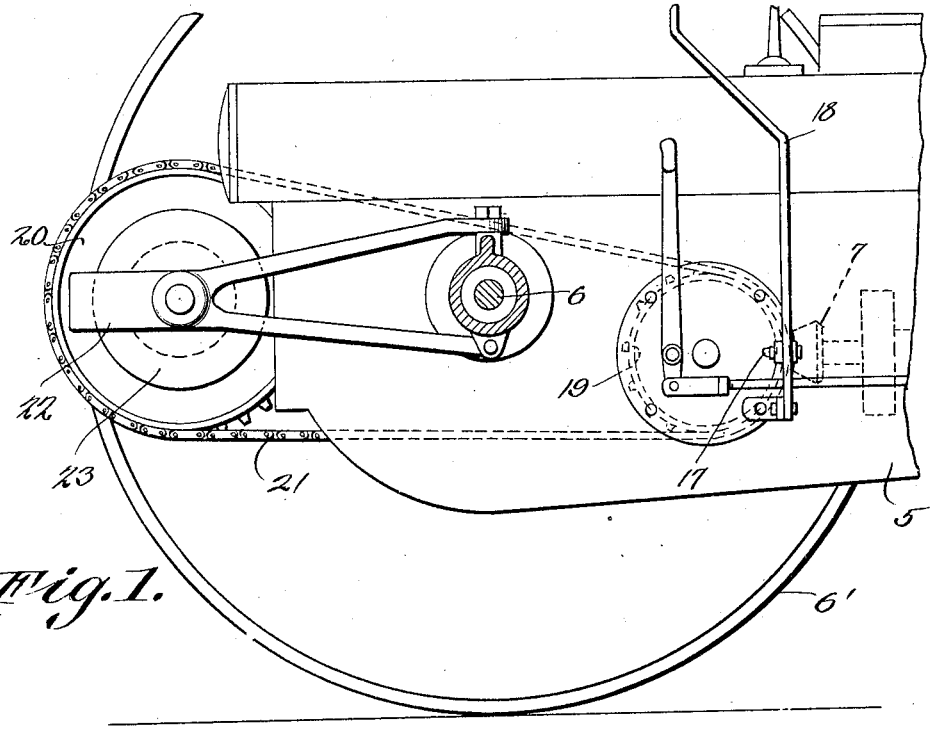
Figure 1 is a fragmental elevational view illustrating the rear end of a tractor supplied with gearing constructed in accordance with the invention.
Figure 2:
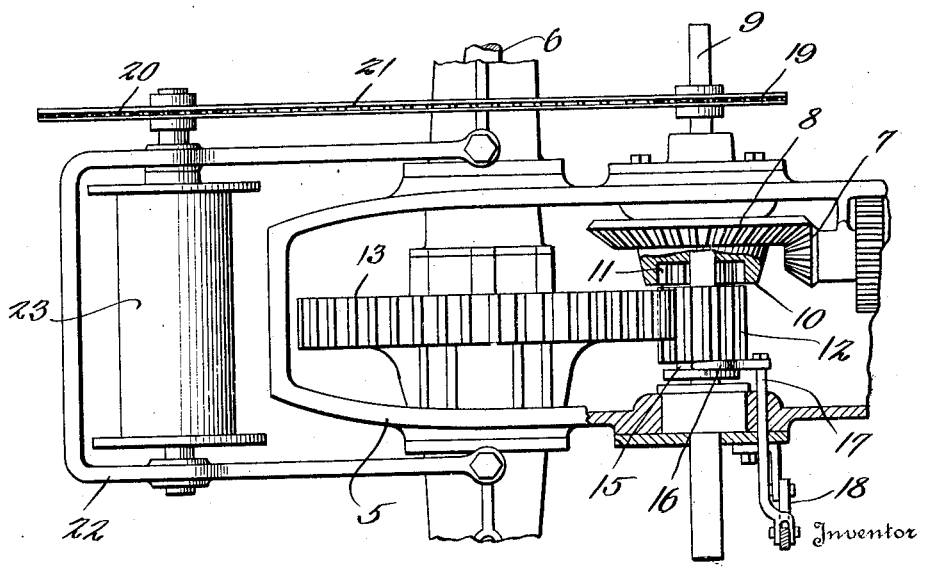
Figure 2 is a longitudinal sectional view through the rear end of the tractor.

Referring to the drawing in detail, the reference character 5 indicates a gear housing formed with suitable openings in the side walls thereof through which extends the rear axle 6 on which the bull wheels 6' are mounted.

The reference character 7 indicates a pinion carried at one end of the drive shaft of the usual transmission, which pinion meshes with the gear 8 keyed or otherwise secured to the power shaft 9 of the tractor.

Formed integral with the gear 8 is an enlargement 10 provided with a cut out portion, the wall thereof having teeth 11 to accommodate the elongated pinion 12 which is slidable on the shaft 9, so that rotary movement of the shaft 9 may be imparted to the axle 6 through the drive gear 13 mounted thereon.

The pinion 12 has a groove 15 formed at one end thereof, which groove accommodates the forked extremity 16 of the rod 17 that in turn is connected with the operating lever 18 that has its upper end arranged adjacent to the operator's seat whereby the operation of the gear 13 may be controlled at the will of the operator.

The reference character 19 indicates a sprocket secured to one end of the shaft 9 which sprocket transmits movement to the sprocket 20, by means of the chain 21 operating thereover.

In the present showing, a supporting frame 22 is illustrated, which frame supports the drum 23, which may be employed for winding a rope or cable thereon in the use of the tractor as a stump puller, but it is to be understood that the gearing may be employed with equally as good results in connection with various other types of machinery.

From the foregoing it will be seen that due to this construction, an operator may take off power from the shaft 9 at various speeds, by operating the transmission mechanism of the tractor in the usual way.

The use of gearing of this type has proven exceptionally efficient in the stump pulling art, since under a heavy load, as by making the initial pull on a stump, the transmission may be operated to bring the low speed of the transmission into operation, and that when the stump has been pulled and it is desired to drag the stump along rapidly, the gearing may be operated to bring high gear into operation, thereby eliminating the necessity of dragging the stump to a place of deposit at a slow rate of speed.

It might be further stated that the structure has proven exceptionally practical in the use of corn shellers or the like, wherein it is necessary to operate at a much faster rate of speed than the device when used as a stump puller.

I claim:—

In combination with the drive axle of a tractor, having a gear thereon, a shaft arranged in parallel relation with the axle, a ring gear keyed on the shaft, said ring gear having a lateral extension formed with internal teeth, an elongated gear loosely mounted on the shaft and adapted to be moved to engage the teeth of the internal gear, said elongated gear being in mesh with the first mentioned gear, means for moving the elongated gear into and out of contact with the teeth of the internal gear, means in mesh with the ring gear for directing rotary movement to the shaft, and a sprocket on the shaft for receiving rotary motion from the shaft.

In testimony that I claim the foregoing as my own, I have hereto affixed my signature.

JAMES C. WILLIAMSON.